(12) United States Patent
    Schüsslbauer et al.

(10) Patent No.: US 9,093,817 B2
(45) Date of Patent: Jul. 28, 2015

(54) MOVABLE MODULAR HOUSING FOR A SHORT PULSE LASER WITH INTEGRATED AMPLIFIER

(71) Applicant: PHOTON ENERGY GmbH, Ottensoos (DE)

(72) Inventors: Wolfgang Schüsslbauer, Boppelsen (CH); Hans Amler, Lauf a.d. Pegnitz (DE); Josef Thumbs, Breitenbrunn (DE)

(73) Assignee: Photon Energy GMBH, Ottensoos (DE)

( * ) Notice: Subject to any disclaimer, the term of this patent is extended or adjusted under 35 U.S.C. 154(b) by 0 days.

(21) Appl. No.: 14/407,081

(22) PCT Filed: Oct. 19, 2012

(86) PCT No.: PCT/EP2012/004376
    § 371 (c)(1),
    (2) Date: Dec. 11, 2014

(87) PCT Pub. No.: WO2013/185793
    PCT Pub. Date: Dec. 19, 2013

(65) Prior Publication Data
    US 2015/0110136 A1    Apr. 23, 2015

(30) Foreign Application Priority Data
    Jun. 12, 2012  (DE) .......................... 10 2012 011 453

(51) Int. Cl.
    *H01S 3/30*    (2006.01)
    *H01S 3/091*   (2006.01)
(52) U.S. Cl.
    CPC ...................................... *H01S 3/091* (2013.01)
(58) Field of Classification Search
    USPC ............................. 372/6, 8, 25, 30, 50.11, 92
    See application file for complete search history.

(56) References Cited

U.S. PATENT DOCUMENTS

| 4,935,938 | A | 6/1990 | Gressly et al. |
| 2005/0265407 | A1 | 12/2005 | Braun et al. |
| 2009/0213879 | A1* | 8/2009 | Stadler et al. .................... 372/20 |
| 2010/0177794 | A1* | 7/2010 | Peng et al. ....................... 372/25 |
| 2011/0310468 | A1 | 12/2011 | Hertwig et al. |
| 2015/0063380 | A1* | 3/2015 | Liu ................................... 372/6 |

FOREIGN PATENT DOCUMENTS

| EP | 2003744 A1 | 12/2008 |
| WO | WO2013185793 A1 | 12/2013 |

OTHER PUBLICATIONS

International Preliminary Report on Patentability; Mailed Jul. 28, 2014 for the related PCT Application No. PCT/EP2012/004376.

* cited by examiner

*Primary Examiner* — Dung Nguyen
(74) *Attorney, Agent, or Firm* — Mendelsohn, Drucker & Dunleavy, P.C.; Steve Mendelsohn

(57) ABSTRACT

The invention relates to a short pulse laser (1) having a first optical plate (3) on which a seed laser oscillator (4), a pulse picker (5), and a fiber coupling-in optical unit (6) are mounted so as to be mechanically stable in relation to one another, and second optical plate (7), which is separate from the first optical plate (3) and on which a fiber coupling-out optical unit (9) and at least one amplifier stage (8, 30, 31) are mounted so as to be mechanically stable in relation to one another. The fiber coupling-in optical unit (6) of the first optical plate (3) and the fiber coupling-out optical unit (9) of the second optical plate (7) are optically interconnected by a flexible light guiding element (10). The hybrid short pulse laser (1) has a compact design and can be operated at low cost.

12 Claims, 3 Drawing Sheets

MOVABLE MODULAR HOUSING FOR A SHORT PULSE LASER WITH INTEGRATED AMPLIFIER

FIELD OF THE INVENTION

The invention relates to a short pulse laser, in particular for generating laser pulses in the ps range for application in industrial and scientific environments. In this case, the invention is concerned with the desire for the laser to have as compact a construction as possible with at the same time high economic viability.

BACKGROUND OF THE INVENTION

The currently known short pulse lasers for generating laser pulses in the ps range with pulse energies of more than 10 µJ are constructed completely discretely using so-called free-space optics in order to achieve the stability and reliability demanded in industry and science. In this case, all the optical components necessary for generating the short laser pulses, including a seed laser oscillator, a postamplifier chain and a pulse picker, are mounted mechanically stably with respect to one another on an optical plate. In order that the free beam path realized thereby is kept inherently mechanically stable, water cooling and complex temperature stabilization are furthermore used. A construction using free-space optics requires a relatively large structural space. The required water cooling and temperature stabilization entail comparatively high operating costs. A construction using fiber technology is problematic owing to the occurrence of nonlinear optical effects. Without a stretcher-compressor combination, it is not possible to achieve the desired short pulse durations with sufficient pulse energy.

SUMMARY OF THE INVENTION

The invention is based on the object of specifying a short pulse laser of the type mentioned in the introduction which can be constructed as compactly as possible in conjunction with high beam quality and which enables comparatively low operating costs.

This object is achieved according to the invention by means of a short pulse laser comprising a first optical plate, on which a seed laser oscillator, a pulse picker and a fiber coupling-in optical unit are mounted mechanically stably with respect to one another, and comprising a second optical plate, which is separate from the first optical plate and on which a fiber coupling-out unit and at least one amplifier stage are mounted mechanically stably with respect to one another. In this case, the fiber coupling-in optical unit of the first optical plate and the fiber coupling-out unit of the second optical plate are optically connected to one another by means of a flexible light guiding element.

In this case, the invention surprisingly departs from the previous cost-intensive construction of the entire short pulse laser including seed laser, pulse picker and amplifier chain using free space optics. Instead, a hybrid technology is proposed, wherein the seed laser and the pulse picker are constructed discretely using free space optics, wherein use is made of a flexible connection to an output amplifier with at least one amplifier stage by means of a light guiding element, and wherein the output amplifier is constructed again using discrete free space optics.

Whereas water cooling and complex temperature stabilization are generally required in the case of a conventional construction of the short pulse laser completely using free space optics, since the complete beam path has to be inherently mechanically stable, air cooling can be used in the case of the hybrid construction proposed. The laser constructed using hybrid technology therefore has lower operating costs. The beam path of the short pulse laser specified, which beam path is divided between two flexibly coupled optical plates, overall enables a very compact construction since, unlike previously, the beam path is not to be mounted completely on a single continuous optical plate. In particular, the two optical plates can be arranged in different planes, without further consideration having to be given to complex mechanical coupling of the separate components. By way of example, the two optical plates can be mounted at a housing of the short pulse laser in a simple manner.

The seed laser oscillator can be embodied as a mode-locked solid-state laser, as a mode-locked fiber laser or as a pulsed laser diode, in particular as a so-called gain-switched laser diode. In the case of a pulsed laser diode, a separate pulse picker can be obviated if this functionality is provided by the pulsed laser diode as such. If a pulsed laser diode is used as the seed laser oscillator, then it can be linked into the short pulse laser using free space technology or via a fiber coupling.

The output amplifier can be passed through singly or multiply. A plurality of amplifier stages that are passed through successively are preferably encompassed. The amplifier medium is a solid-state crystal, for example. A diode laser is expediently used as pump laser. This first pump laser is advantageously arranged separately from the second optical plate, as a result of which the thermal load at the output amplifier is reduced. A flexible light guiding element, in particular a fiber, is then expediently provided for coupling-in purposes.

Advantageously, the light guiding element coupling the two optical plates is embodied as an active fiber, wherein a second pump laser, in particular a diode laser, is provided for pumping the active fiber. In other words, a preamplifier is provided between the seed laser arranged on the first optical plate and the output amplifier or an amplifier stage arranged on the second plate, said preamplifier simultaneously being used as a flexible connection. The optical unit required for coupling in the pump light is advantageously coupled to the active fiber. The pump light is expediently forwarded to said unit likewise via a flexible light guiding element, in particular a fiber.

Preferably, one or each pump laser is arranged separately from the optical plates in particular in an electrical supply part, wherein a light guiding element, in particular a fiber, is respectively provided for coupling the pump light into the amplifier stage and/or into the active fiber. This reduces thermal loading on the laser structural units formed by the two optical plates. This is in turn beneficial for air cooling of the laser structural units. The external arrangement of the pump lasers additionally affords maintenance advantages. Replacement of defective pump or diode lasers is facilitated. An intervention in the optical construction of the short pulse laser is not necessary for this purpose.

The hybrid construction furthermore makes it possible, in one advantageous embodiment variant, to mount the first optical plate and/or the second optical plate vertically with lateral mounting construction spatially separately from one another in a housing. This configuration is advantageous for air cooling, in particular. For this purpose, in one expedient configuration, a fan is provided, said fan being designed for generating an air flow along the optical plates. For the purpose of cooling heat sources situated in the laser, such as e.g. an amplifier crystal, etc., they can advantageously be mounted in a thermally conductive manner on a cooling block, which is in turn cooled by means of a corresponding heat sink with an air flow. If the construction of the short pulse laser is chosen in such a way that the two optical plates are opposite one another in the operating state, a flow channel which can be ideally utilized for air cooling arises in the interior between the plates. At the same time, such a construction is extremely compact.

In principle, however, it is also possible, of course, to provide water cooling instead of the preferred air cooling for the short pulse laser described in the present case.

Preferably, the first optical plate and/or the second optical plate are/is mounted in a foldable fashion in the housing. In this embodiment variant, a construction that is compact and additionally exhibits ease of maintenance is made possible, wherein the optical components are "folded in" in the mounted state in the housing, but become reachable for adjustment or maintenance purposes by the optical plates being folded back. For this purpose, one or each optical plate is fixed to the housing, in particular to a baseplate of the housing of the short pulse laser, in a pivotable manner for example by means of a joint mechanism.

With further preference, the seed laser oscillator is arranged on one side of the first optical plate and the pulse picker is arranged on the opposite, other side of the first optical plate. A double-sided arrangement of the optical components on the optical plate enables the compactness of the short pulse laser to be increased further. Correspondingly advantageously, a first amplifier stage is arranged on one side of the second optical plate and a second amplifier stage is arranged on the opposite, other side of the second optical plate. This results in a very space-saving construction overall for the amplifier stage. The optical connection of the respective units on the front and rear sides of the optical plate takes place through the plate, in particular, for which purpose a correspondingly aligned mirror element is provided for beam deflection.

The seed laser oscillator is provided as a mode-locked solid-state laser, for example, wherein a correspondingly reflectively coated end mirror is provided for coupling out the laser pulses. For the purpose of generating pulses, a saturable absorber, in particular, is provided in the laser oscillator. By way of example, an Nd:YVO$_4$ crystal is used as laser-active solid. The saturable absorber is for example a suitable semiconductor material such as InGaAs.

An acousto-optical modulator (AOM) or an electro-optical modulator (EOM) is preferably used as the pulse picker. The seed laser oscillator at a wavelength of 1064 nm, for example, supplies pulses having a pulse length of between 10 ps and 1 ns and having a pulse energy in the sub-nJ range. Individual pulses or pulse sequences having a pulse repetition rate of between 0 Hz (individual pulse) and 10 MHz can be coupled out by means of the pulse picker. After passing through the fiber amplifier, the pulse energy is approximately 50 nJ to 500 nJ. After passing through the output amplifier, the pulse energy is approximately 50 µJ to 1 mJ.

BRIEF DESCRIPTION OF THE DRAWINGS

Exemplary embodiments of the invention are explained in greater detail with reference to a drawing, in which.

DETAILED DESCRIPTION

Figure 1:
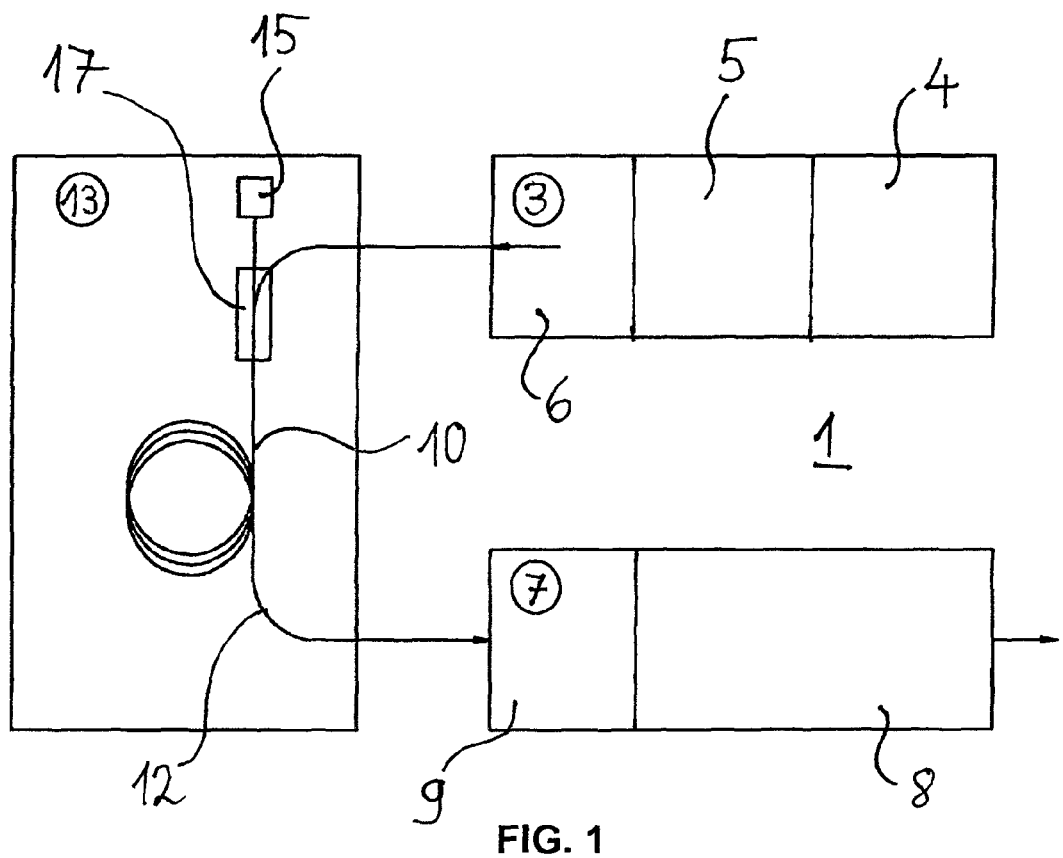
FIG. 1: shows in schematic illustration a short pulse laser using hybrid technology.

FIG. 1 schematically illustrates the construction of a short pulse laser 1 using a hybrid technology. The short pulse laser 1 comprises, on a first optical plate 3, a seed laser oscillator 4 and a pulse picker 5 each using free space optics. The pulses coupled out from the seed laser oscillator 4 by means of the pulse picker 5 are forwarded to a fiber coupling-in optical unit 6, which is likewise fixedly mounted on the first optical plate 3.

The short pulse laser 1 furthermore comprises a second optical plate 7, on which an amplifier stage 8 is formed using free space optics. Pulses to be amplified are fed to said amplifier stage via a fiber coupling-out optical unit 9, which is likewise mounted on the second optical plate 7.

For flexible optical coupling of the seed laser oscillator 4 or of the first optical plate 3 to the amplifier stage 8 or to the second optical plate 7, the short pulse laser 1 comprises a flexible light guiding element 10, which is embodied as an optical waveguide in the present case.

The light guiding element 10 is designed as an active fiber 12 for preamplifying the pulses passing through. The fiber amplifier 13 is mirrored by means of a pump laser 15, the pump light of which is coupled into the active fiber 12 via a coupling-in selector switch 17.

It becomes evident that the first optical plate 3 and the second optical plate 7 can be moved relative to one another, in principle, without the optical construction as such requiring readjustment. The optical coupling of the two plates 3, 7 is provided by the flexible light guiding element 10. In contrast to an overall construction using rigid free-space optics on a single optical plate, the embodiment shown allows a very flexible design and, in particular, an extremely compact construction.

Figure 2:
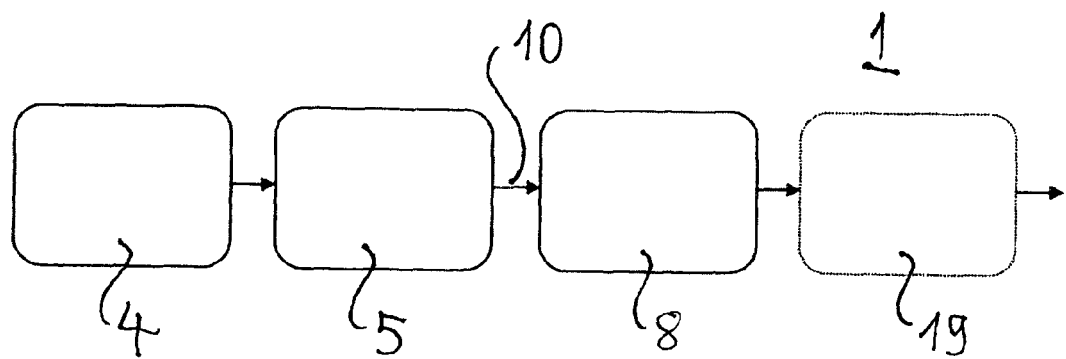
FIG. 2: shows highly schematically a hybrid concept for the construction of a short pulse laser.

FIG. 2 illustrates highly schematically once again the fundamental concept of a short pulse laser 1 using hybrid technology. While the seed laser oscillator 4, the pulse picker 5 and the amplifier stage 8 are mounted on the respective optical plate in each case using free space optics, the light guiding element 10 allows an inherently arbitrary arrangement of the optical plates with respect to one another. In one advantageous embodiment variant, an additional pulse picker 19 can be provided, which can separate amplified pulses after passing through the amplifier stage 8.

Figure 3:
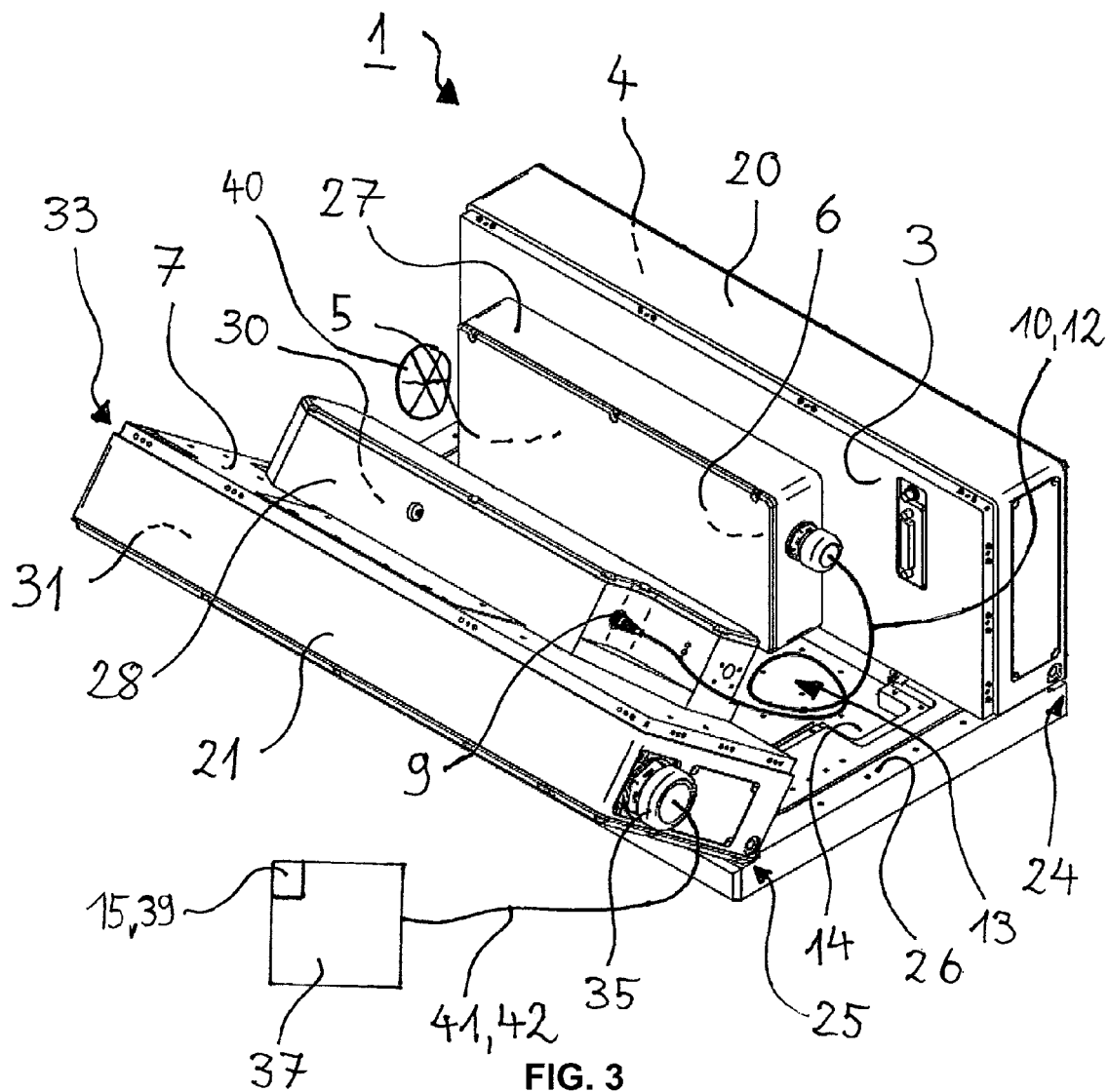
FIG. 3: shows in a three-dimensional illustration a short pulse laser using hybrid technology with a partly pivoted subunit.

FIG. 3 shows in a three-dimensional illustration a concrete construction of a short pulse laser 1 using hybrid technology. In accordance with the scheme illustrated in FIG. 1, the short pulse laser 1 comprises a first optical plate 3 and a second optical plate 7 separate therefrom. Frame elements 20 and 21 are respectively mounted on the outer side of the two optical plates 3, 7. Subunits described below are respectively mounted in the interior of the frame elements 20, 21 using free space optics. By means of the frame elements 20, 21, the optical plates 3, 7 are mounted on a base 26 of a housing (not illustrated in more specific detail) in a pivotable manner in each case by means of a pivot bearing 24 and 25, respectively.

Further frame elements 27 and 28 are respectively fixed on the inner side of the optical plates 3, 7. Within said frame elements 27, 28, further subunits described below are mounted on the optical plates 3, 7 using free space optics.

The seed laser oscillator 4 is constructed using free-space optics on the outer side of the first optical plate and in the interior of the frame element 27. The short pulses generated in the seed laser oscillator 4 are passed through the first optical plate 3 into a pulse picker 5, which is mounted on the other side of the first optical plate 3. The pulses coupled out by means of the pulse picker 5 are coupled into a flexible light guiding element 10 via a fiber coupling-in optical unit 6. The pulse picker 5 and the fiber coupling-in optical unit 6 are arranged within the frame element 27. The light guiding element 10 is embodied as an active fiber 12 for the embodiment of a fiber amplifier 13 in accordance with FIG. 1. The pump light for the fiber amplifier is fed from an external pump laser 15 to the short pulse laser 1 by means of a fiber and is coupled into the active fiber 12 by means of a coupling-in selector switch 17 (not illustrated here). The fiber 12 is illustrated in a shortened manner in FIG. 3. For the embodiment of the fiber amplifier 13, however, the fiber 12 is actually led in multiple turns within a cutout 14 in the base 26. The coupling-in selector switch 17 is also arranged there.

Via the fiber 12 or via the light guiding element 10, the pulses that are coupled out and preamplified in the fiber amplifier 13 pass into the fiber coupling-out optical unit 9, which is arranged on the inner side of the second optical plate 7 within the frame element 28. A first amplifier stage 30 is formed there using free space optics. A second amplifier stage 31 is formed within the frame element 21 on the outer side of the second optical plate 7. The first and second amplifier stages 30, 31 are optically coupled through the second optical plate 7. After passing through the second amplifier stage 31, the then highly amplified pulses pass toward the outside via a light exit 33 situated on the rear side of the frame element 21.

The short pulse laser 1 shown furthermore comprises a plurality of supply connections 35. Alongside the electrical supply and control lines, external pump light sources provided for pumping the amplifier stages 30, 31 and for pumping the active fiber 12 are also coupled in via the supply connections 35.

The corresponding pump lasers 15, 39 are embodied as diode lasers and arranged externally within an electrical supply part 37 for the short pulse laser 1. The pump light of the pump lasers 15, 39 is coupled into the short pulse laser 1 via corresponding fibers 41, 42. The external arrangement of the pump lasers 15, 39 enables the thermal loading of the short pulse laser 1 to be reduced. At the same time, ease of maintenance is increased.

A flow channel is formed in the interspace between the two optical plates 3, 7. For the purpose of cooling the heat sources, an air flow through said flow channel is generated by means of the fan 40.

Figure 4:
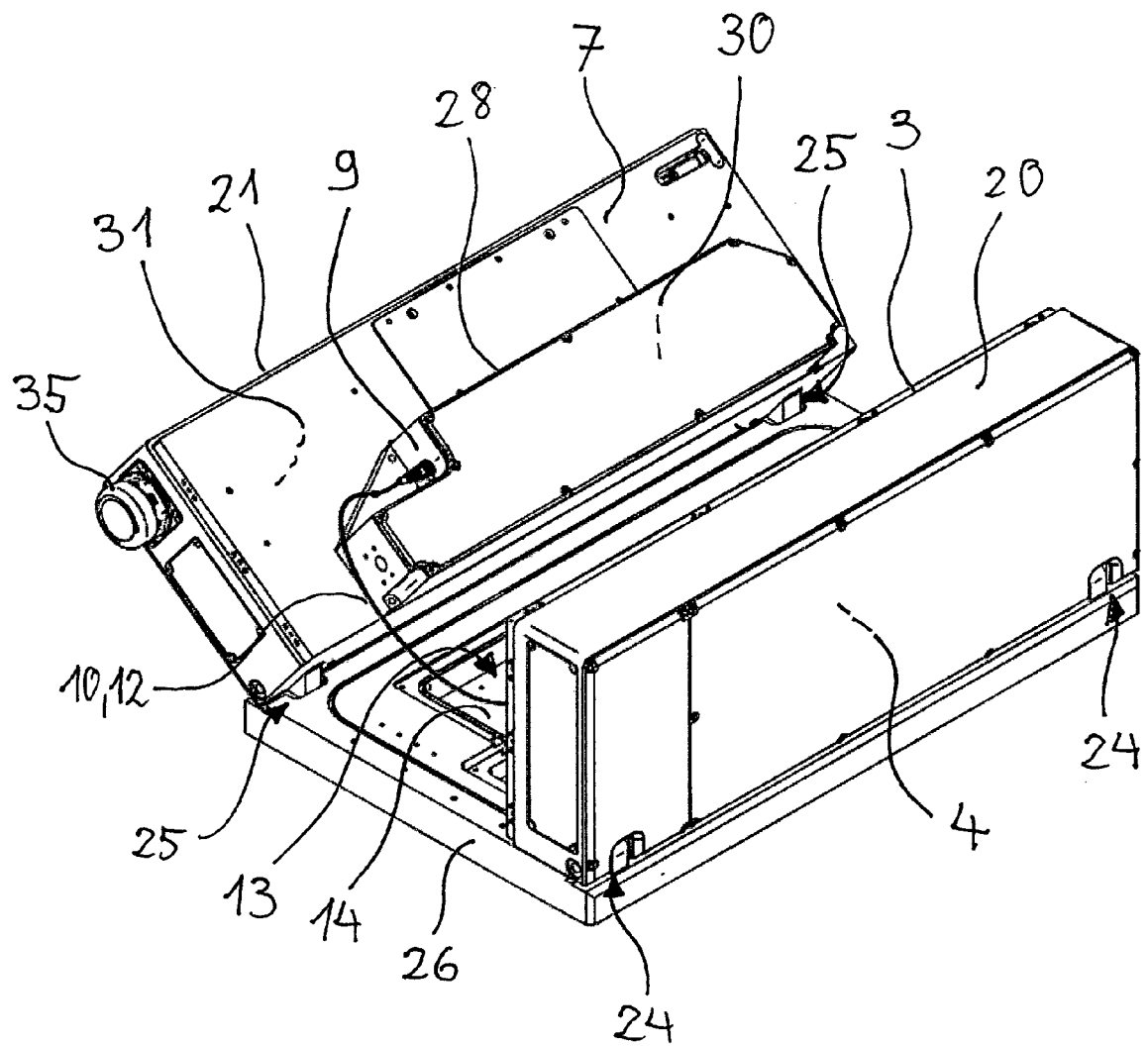
FIG. 4: shows in a three-dimensional illustration the short pulse laser corresponding to FIG. 3 from a different perspective.

FIG. 4 illustrates the short pulse laser 1 corresponding to FIG. 3 from a different perspective. In particular, the pivotable mounting of the two optical plates 3, 7 by means of the pivot bearings 24, 25 now becomes visible. Moreover, the frame element 28 mounted on the inner side of the second optical plate 7 now becomes visible from a different perspective.

FIGS. 3, 4 illustrate the short pulse laser 1 in a maintenance state. In this case, the second optical plate 7 is pivoted outward at the base 26. By opening the covers of the frame elements 21, 28, it is easily possible to reach the optical construction in the interior. In the operating state of the short pulse laser 1, the two optical plates 3, 7 are situated upright on the base 26 parallel to one another.

Overall it becomes evident that the short pulse laser 1 described in the present case using hybrid technology has an extremely compact construction. Water cooling and complex temperature stabilization are not required. The short pulse laser 1 illustrated in FIGS. 3, 4 is cooled exclusively via air cooling by means of the fan 40. The pivotable mounting of the optical plates 3, 7 simplifies the maintenance outlay in comparison with conventional short pulse lasers. The externally arranged pump or diode lasers 15, 40 can easily be exchanged as parts subject to wear, without necessitating an intervention in the construction of the short pulse laser 1.

LIST OF REFERENCE SIGNS

1 Short pulse laser
3 First optical plate
4 Seed laser oscillator
5 Pulse picker
6 Fiber coupling-in optical unit
7 Second optical plate
8 Amplifier stage
9 Fiber coupling-out optical unit
10 Light guiding element
12 Active fiber
13 Fiber amplifier
14 Cutout
15 Pump laser
17 Coupling-in selector switch
19 Pulse picker, additional
20 Frame element
21 Frame element
24 Pivot bearing
25 Pivot bearing
26 Base
27 Frame element
28 Frame element
30 First amplifier stage
31 Second amplifier stage
33 Light exit
35 Supply connection
37 Electrical supply part
39 Pump laser
40 Fan
41 Fiber
42 Fiber

The invention claimed is:

1. A short pulse laser (1) comprising:
a first optical plate (3), on which a seed laser oscillator (4), a pulse picker (5) and a fiber coupling-in optical unit (6) are mounted mechanically stably with respect to one another; and
a second optical plate (7), which is separate from the first optical plate (3) and on which a fiber coupling-out unit (9) and at least one amplifier stage (8, 30, 31) are mounted mechanically stably with respect to one another, wherein:
the fiber coupling-in optical unit (6) of the first optical plate (3) and the fiber coupling-out unit (9) of the second optical plate (7) are optically connected by a flexible light guiding element (10); and
the first optical plate (3) and the second optical plate (7) separate therefrom are flexibly coupled.

2. The short pulse laser (1) as claimed in claim 1, wherein a first pump laser (39) is provided for pumping the amplifier stage (8, 30, 31).

3. The short pulse laser (1) as claimed in claim 2, wherein:
the light guiding element (10) is an active fiber (11); and
a second pump laser (15) is provided for pumping the active fiber (11).

4. The short pulse laser (1) as claimed in claim 2, wherein:

the first pump laser (39) is arranged separately from the optical plates (3, 7) in an electrical supply part (37); and at least one other light guiding element (41, 42) is respectively provided for coupling pump light into the amplifier stage (8, 30, 31) and/or into an active fiber (12).

5. The short pulse laser (1) as claimed in claim 1, wherein the first optical plate (3) and/or the second optical plate (7) are/is mounted vertically with lateral mounting construction in a housing.

6. The short pulse laser (1) as claimed in claim 1, wherein the first optical plate (3) and/or the second optical plate (7) are/is mounted in a foldable fashion in a housing.

7. The short pulse laser (1) as claimed in claim 1, wherein:

the seed laser oscillator (4) is arranged on one side of the first optical plate (3); and the pulse picker (5) is arranged on the opposite, other side of the first optical plate (3).

8. The short pulse laser (1) as claimed in claim 1, wherein:

a first amplifier stage (30) is arranged on one side of the second optical plate (7); and a second amplifier stage (31) is arranged on the opposite, other side of the second optical plate (7).

9. The short pulse laser (1) as claimed in claim 1, wherein:

the first optical plate (3) and the second optical plate (7) are opposite one another in an operating state such that a flow channel for air cooling arises in an interspace between the optical plates (3, 7); and a fan (40) for cooling the laser is provided, said fan being designed to generate an air flow along the optical plates (3, 7).

10. The short pulse laser (1) as claimed in claim 3, wherein the second pump laser (15) is arranged separately from the optical plates (3, 7).

11. The short pulse laser (1) as claimed in claim 2, wherein the first pump laser (39) is a diode laser.

12. The short pulse laser (1) as claimed in claim 3, wherein the second pump laser (15) is a diode laser.

* * * * *